US00RE37854E

(19) United States
(12) Reissued Patent
Haimoff

(10) Patent Number: US RE37,854 E
(45) Date of Reissued Patent: Sep. 24, 2002

(54) INVISIBLE SETTING METHOD FOR JEWELRY

(75) Inventor: Manny Haimoff, Lawrence, NY (US)

(73) Assignee: Nili Jewelry, Corp., New York, NY (US)

(21) Appl. No.: 09/448,699

(22) Filed: Nov. 24, 1999

Related U.S. Patent Documents

Reissue of:
(64) Patent No.: 5,690,477
Issued: Nov. 25, 1997
Appl. No.: 08/828,209
Filed: Mar. 21, 1997

U.S. Applications:

(63) Continuation-in-part of application No. 08/676,846, filed on Jul. 8, 1996, now abandoned.

(51) Int. Cl.[7] ..... B22C 7/02; B22D 19/00
(52) U.S. Cl. ..... 164/9; 164/35; 164/98; 164/516
(58) Field of Search ..... 164/9, 10, 11, 164/34, 35, 36, 516, 45, 98

(56) References Cited

U.S. PATENT DOCUMENTS 1,654,335 A * 12/1927 Lindroth ..... 29/10
2,388,124 A * 10/1945 Crews ..... 110/185
2,749,597 A * 6/1956 Fus ..... 29/10
2,790,220 A * 4/1957 Fox ..... 164/35
4,154,282 A * 5/1979 Kull ..... 164/34
4,392,289 A * 7/1983 Michaud ..... 164/10
4,639,346 A * 1/1987 Pav et al. ..... 264/175
4,793,045 A * 12/1988 Singer ..... 164/35
4,813,246 A * 3/1989 Richards ..... 63/26
5,072,601 A * 12/1991 Slowinski ..... 403/361

FOREIGN PATENT DOCUMENTS

EP 201394 * 11/1986 ..... 164/9

* cited by examiner

*Primary Examiner*—Kuang Y. Lin
(74) *Attorney, Agent, or Firm*—Katten Muchin Zavis Rosenman

(57) ABSTRACT

A rigid bar (or segment) on which stones will be at least partially supported is positioned in a rubber mold for creating a wax pattern of the jewelry, injecting wax to form a wax model of the jewelry including the metal bar to fit into an incision in the stones. The model with the metal bar forms the invisible pre-set stone mount. Stones are then placed into set position in the wax pattern on opposite sides of the metal bar. Once the setting is complete, the jewelry is created using known "lost-wax" method of manufacturing jewelry.

9 Claims, 4 Drawing Sheets

INVISIBLE SETTING METHOD FOR JEWELRY

Matter enclosed in heavy brackets [ ] appears in the original patent but forms no part of this reissue specification; matter printed in italics indicates the additions made by reissue.

This [is] *application is a Reissue of U.S. Pat. No. 5,690,477 which is based on* a continuation-in-part of U.S. application Ser. No. 08/676,846, filed Jul. 8, 1996, directed to INVISIBLE PRE-SETTING METHOD FOR JEWELRY, inventor Manny Haimoff, now abandoned.

FIELD OF THE INVENTION

The present invention is generally directed to the production of jewelry and more particularly to a type of jewelry setting method in which support for stones in the jewelry are not visible from the exterior of the jewelry.

BACKGROUND OF THE INVENTION

Jewelry, such as rings, earrings, pendants, etc. . . . are typically comprised of precious metals such as gold, silver etc., supporting stones, whether non-precious, semi-precious or precious stones such as diamonds. Projecting metal clips or bars typically support and surround the stones sufficiently and visibly so the stones do not fall out.

Stones which have been invisibly set (i.e., the supporting metal is not visible from the external surface) in a metal piece such as gold or platinum have required an all-metal frame prior to setting stones into the piece of jewelry. A typical example is shown in U.S. Pat. No. 5,072,601. The stones in such settings generally have incisions on one or more sides below the girdle of the stones into which the metal is inserted so that the metal is not externally visible from the top of the jewelry. In this and some of the traditional methods of setting, much time is required to finish one piece of jewelry—sometimes only one or two pieces per day may be finished. Reducing dependence on highly skilled and costly labor of stone setters in the "invisible" set process and to create less expensive jewelry of such types have been goals of some manufacturers.

A new setting method is available on the market today for setting stones of various shapes such as regular baguettes, rounds, square, princess stones and others by performing the setting in wax. This process employs wax taken out of a rubber mold. One who inserts the stones then casts the piece of jewelry in the lost-wax method of casting. The gold casting would be complete, and the stones would be permanently set in place in the metal.

Much experimentation was undertaken with all-wax invisible set methods prior to arriving at the invention. The all-wax invisible methods, however, were found to be ineffective. In these methods, a rubber mold made from an existing silver model was injected with various waxes (such as plastic waxes and more "waxy" waxes) to arrive at a wax which could be injected into the mold and which would hold up under the pressure of trying to set the stones along a middle bar that would fit into the stone grooves. In the first experiments, a two-row anniversary band about 6 mm wide was used, containing between 18 and 20 princess-cut stones, totaling one carat weight—i.e., each stone weighed approximately five points. These stones were approximately 2 to 2.2 millimeters in diameter. The model included a bar along the side of the outer walls. When the various waxes were removed from the rubber molds, allowed to cool and a very experienced setter attempted to insert the tiny stones into the tiny groove or incision, the center bar (which must be sufficiently thin to slip into the groove of the stone) cracked, moved or bent.

Properly positioning pre-cut stones in an open wax model designed to be invisibly set is extremely difficult and requires a high degree of care to not displace the stones prior to casting. Casting the wax is also extremely difficult, particularly when small stones are used in a pliable material like wax because the center bar or bars which is/are used to support the stones in the invisible setting process were too soft. Furthermore, if the stones in the wax model are not properly set, such defect is not curable without damaging the piece of jewelry.

An object of the invention is therefore to avoid or decrease at least some of these disadvantages of the prior art setting methods.

Another object of the invention is also to improve the lost wax method for casting articles of invisibly set jewelry by reducing the services of highly skilled setting labor.

SUMMARY OF INVENTION

These and other objects of the invention, which shall be apparent hereafter, are achieved by the present INVISIBLE SETTING METHOD FOR JEWELRY in which a metal bar (or segment) on which stones will be at least partially supported is positioned in a rubber mold for creating a wax pattern of the jewelry, injecting wax to form a wax model of the jewelry including the metal bar to fit into an incision in the stones. The model with the metal bar forms the invisible pre-set stone mount. Stones are then placed into set position in the wax pattern on opposite sides of the metal bar. Once the setting is complete, the jewelry is created using known "lost-wax" method of manufacturing jewelry.

BRIEF DESCRIPTION OF THE DRAWINGS

The invention will be better understood by the Detailed Description of the Preferred Embodiment, with reference to the drawings, in which.

DETAILED DESCRIPTION OF THE PREFERRED EMBODIMENT

Figure 1:
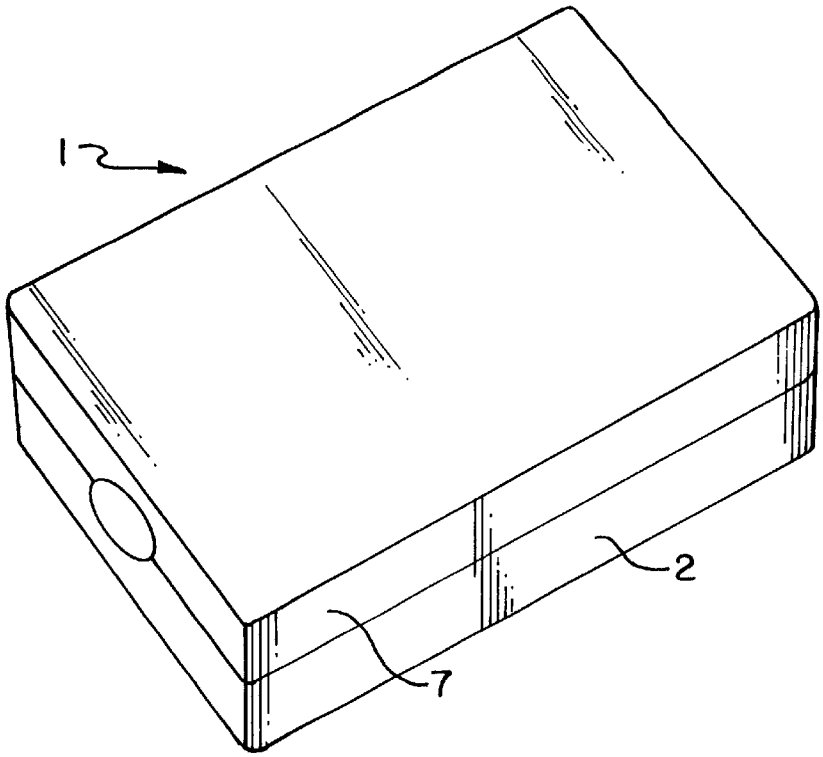
FIG. 1 is a perspective view of a mold for jewelry, depicting a slot into which wax is to be injected.
Figure 2:
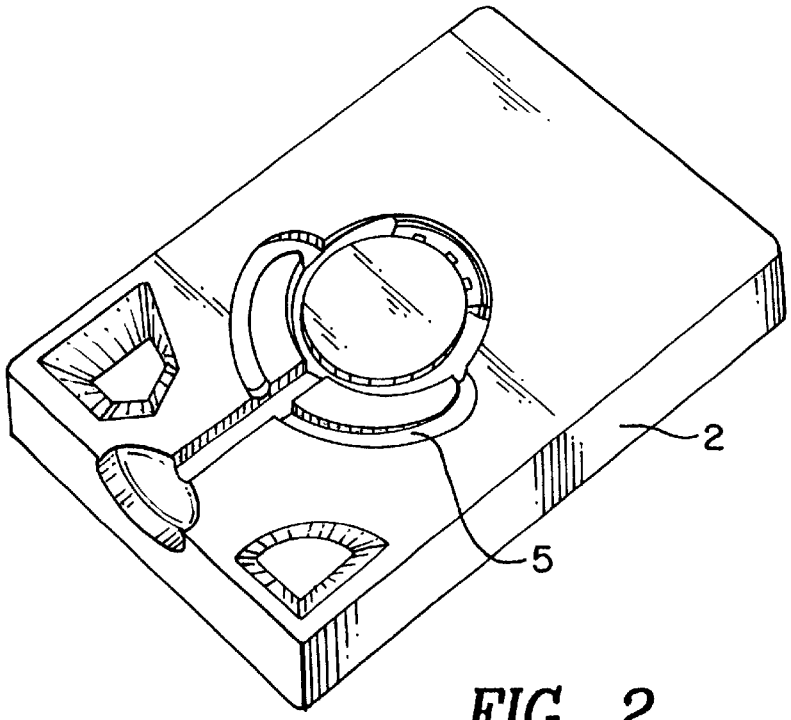
FIG. 2 is a perspective view of the opened mold (lower-half is shown), depicting the shape of the ring (in this example) to be molded.
Figure 3:
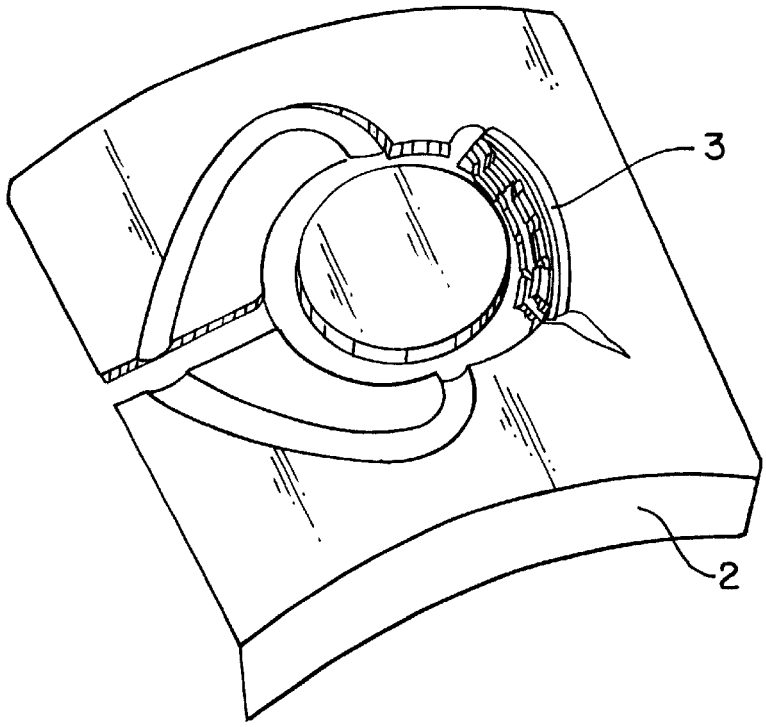
FIG. 3 is a close-up, perspective view of the mold of FIG. 2, depicting the region of the mold corresponding to a stone mount area of a ring.

Referring now to the drawings, wherein like numerals represent like elements, AN INVISIBLE SETTING METHOD FOR JEWELRY is made using a mold 1, as depicted in closed position in FIG. 1. FIG. 2 depicts the lower half 2 of the mold 1 used in the inventive process. FIG. 3 is a close-up perspective view of the mold of FIG. 2, depicting the region 3 of the mold corresponding to a stone mount region 4 of a ring.

Figure 4:
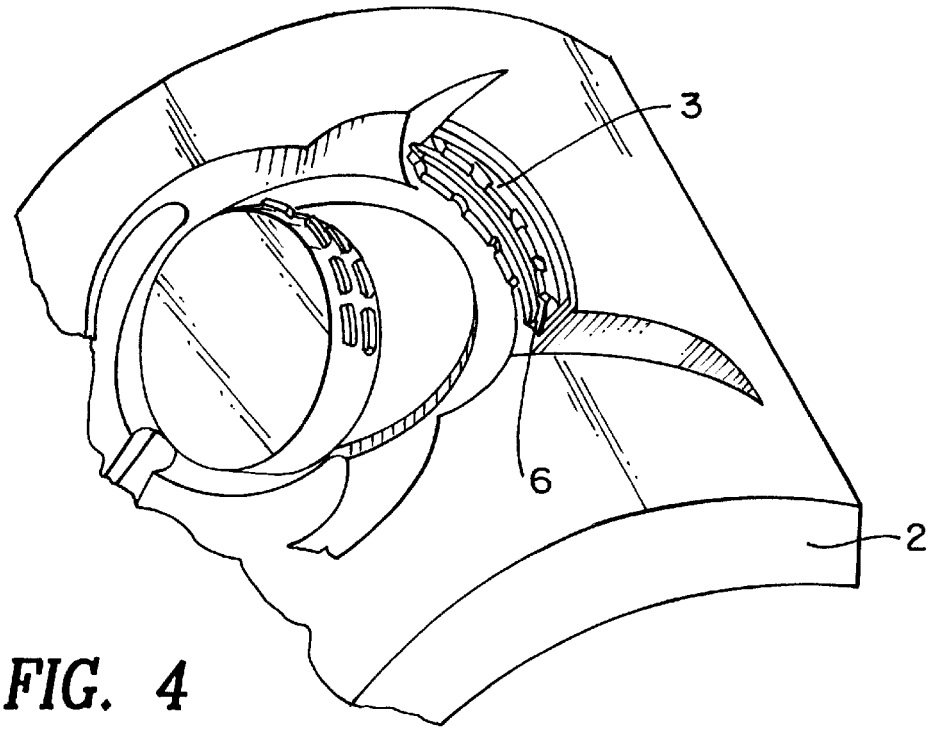
FIG. 4 is similar to FIG. 3, but depicts a metal bar inserted into the region of the mold corresponding to the stone mount region of the jewelry.
Figure 5B:
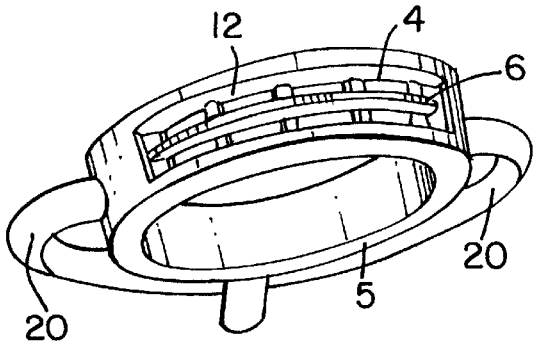
FIG. 5b is a perspective view of a wax ring pattern of jewelry according to the present invention, with the metal bar now in the middle of the stone mount region.
Figure 5A:
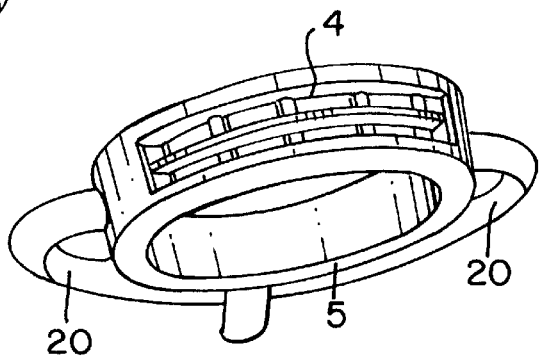
FIG. 5a is a perspective view of a wax ring pattern of jewelry in a standard all wax casting method.

Unlike traditional invisible setting processes which involve setting in all wax or all metal, the present invention involves a combination of both the wax and metal methods. The process involves [first inserting] *providing a wax-like substance and* a metal bar 6 into the mold half 2 as depicted in FIG. 4. The metal bar 6, in this embodiment is directed to a wedding-band type ring, although many shapes of such support on many types of jewelry could be used) and is curved and conforms approximately to the shape of the stone mount area 4 of the ring. Once the bar 6 is inserted, the mold 1 is closed by placing the upper half 7 (see FIG. 1) over the lower half 2 of the mold 1.

The metal bar 6 may be made in various ways. The bars 6 that are necessary for this particular piece may be cast or produced in a stamping or machined method. (In some cases, a metal model instead of a rubber mold may be used.) A model maker may first make a replica of this piece according to the correct height, thickness requirements and the ability to fit into the wax piece. The metal bar 6 is cleaned and the specifications are checked prior to inserting it into the rubber mold 1.

Figure 7A:
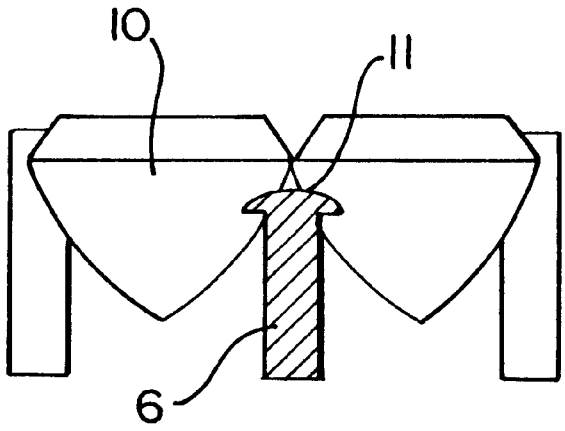
FIG. 7a is a cross-sectional view depicting the metal bar securely holding the stones in position.
Figure 7B:
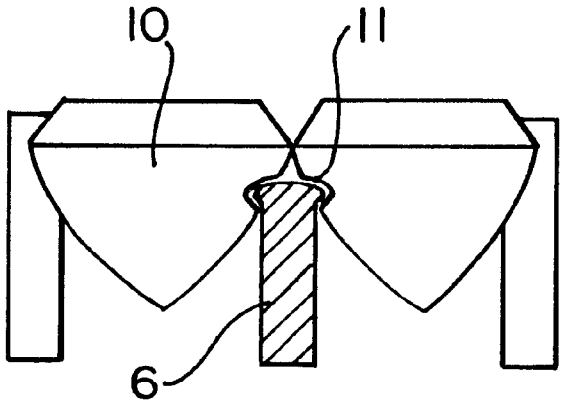
FIG. 7b is a cross-sectional view depicting stones set in wax (including a wax center) showing the wax being chipped so that stones may become loose and fall out.

FIG. 7a, is a cross-sectional view depicting the metal bar 6 holding the stones 10 in position. Using a center-positioned metal bar 6, unlike wax, provides a better fit into grooves 11 of the stone 10. Wax centers of the prior art, by contrast, is much more likely to chip or break (see FIG. 7b), thereby causing the stones to become loose or fall off.

[Once the mold 1 is closed, it] *According to the invention, the mold* is injected preferably with wax (although other material with some similar properties may also be used) by well known wax injection procedures to create a wax replica 5 or pattern of the jewelry (including the excess parts which are used in the creation of the ring, but which are to be trimmed before cleaning and polishing prior to sale). The rubber mold 1 is then opened and a wax model 5 with a metal bar [3] *6* and sidewalls 12 already in place, is now inside the mold 1. The wax model 5 is molded of a predetermined mixture of jewelry casting waxes and could be any combination of green, yellow, blue, or red, purple color, etc., chosen for proper elastic consistency to enable the stones 10 to be invisibly set into the wax model 5.

Figure 6A:
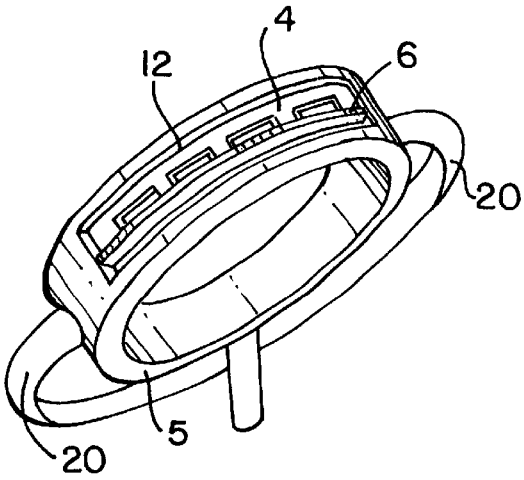
FIGS. 6a, 6b and 6c also show the wax ring pattern in perspective view, but FIGS. 6b and 6c depict stones as they are invisibly set into the stone mount region.
Figure 6B:
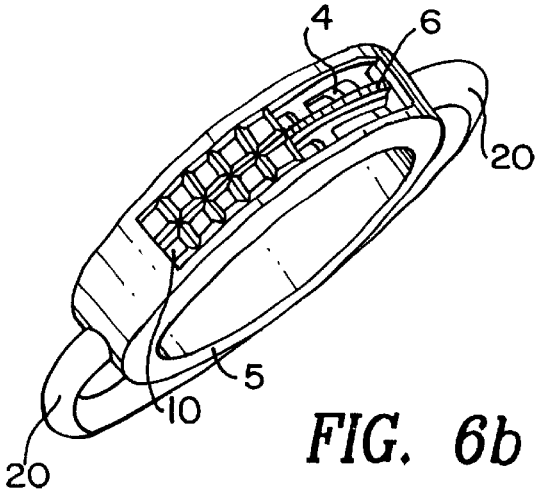
Figure 6C:
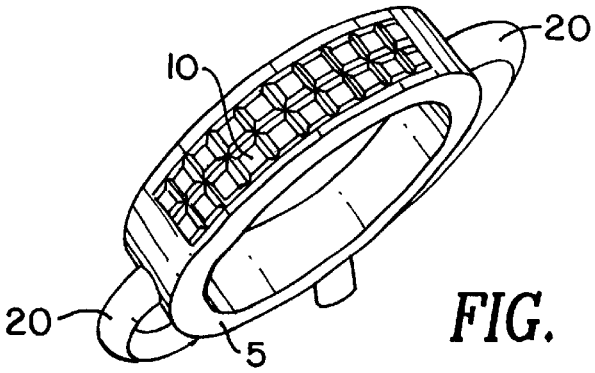

The stones 10 are of specific sizes as designated for each model and are pre-cut by an experienced diamond cutter who cuts grooves 11 of specific size and depth into the stones (see FIG. 7). The stones 10 are then set on opposite sides of the metal (see FIGS. 6b and 6c) by exerting pressure against the sidewalls 12 in such manner that the stones 10 are both now in seated position in the walls 12 (see FIG. 6a) and also fit onto the metal bar 6 (or bars) (see FIG. 7a). In the ring shown in FIG. [6,] *7a* a groove 11 on only one side of the stones 10 is necessary. The other side of the stones 10 do not need the cut, in this instance, because it is being set in the channel wall 12 on its outside edge. Once the stones 10 are set, the metal bar 6 holds the stones 10 toward the center of the ring and provides a strong support at the center where the two rows of stones 10 meet (see FIGS. 6b, 6c).

From this point onward, conventional lost-wax method of manufacturing jewelry is undertaken and includes the next step of embedding the wax model 5 with the metal bar [3] *6* and set stones 10 in a plaster-type "investment" material which is known in the industry. The embedded material and investment material are then heated to sufficiently high temperature such that the wax model [9] *5* is melted away, leaving the mold cavity with the metal bar 6 and stones 10 supported therein. In the "investment" step, many wax models [9] *5* are placed on a wax "tree" which is essentially a vertical wax stalk into which a number of wax models 5 (with stones 10 set therein) are now positioned. The tree is placed in a flask, and the investment material is poured into the flask surrounding and covering the tree.

The next step involves injecting molten metal into the mold cavity left by the wax having been melted away in the cured investment mold. The heating equipment is known in the industry but, in order to prevent damage to the stones, the maximum temperature is carefully controlled. Thereafter, the investment mold with the metal cast (and pre-set invisible stones in place) therein is permitted to cool. The investment material is then separated from the jewelry with the stones preset and bar in place. The rings (now gold and diamonds) are now removed and sent for polishing.

While the preferred embodiment and steps of the invention have been depicted in detail, modifications and adaptations may be made thereto, without departing from the spirit and scope of the invention, as delineated in the following claims:

I claim:

1. A method of manufacturing jewelry having a plurality of stones supported in an invisible stone mount, said method comprising the steps of:

providing [a mold for producing a wax-like pattern of the jewelry;

placing a rigid segment into a stone mount region of the mold corresponding to a stone-mount region of the jewelry;

injecting a wax-like substance to form a wax-like] *a* pattern of said jewelry, including [the] *a* rigid *bar* [segment;

inserting] *and* the stones [into set positions thereof in the wax-like pattern on opposite sides] *on at least one side* of the rigid [segment] *bar* which forms an invisible preset stone mount;

embedding said [wax-like] pattern, containing said rigid [segment] *bar* with the positioned stones in an "investment" material;

melting the [wax-like] pattern to provide a mold cavity with said rigid [segment] *bar* and the supported stones being suspended therein;

injecting molten material into the [mold] *pattern* cavity to form a casting of the jewelry with the invisibly supported stones; and separating the investment material to remove the jewelry with the invisibly preset stones.

2. The method of claim 1, wherein said [rigid segment] *bar* is metallic.

[3. The method of claim 1, wherein said segment is a bar.]

4. The method of claim 2, wherein said metal is gold.

5. The method of claim 1, wherein said [wax-like substance] *pattern* is *made of* wax.

6. The method of claim 1, wherein [said] *a* mold for producing said [wax-like] pattern is metallic.

7. The method of claim 1, further providing the step of trimming said jewelry to remove undesired portions.

8. The method of claim 7, further providing the step of finishing the jewelry.

9. The method of claim 1, wherein said investment material is a plaster material.

10. A method of manufacturing jewelry having a plurality of stones supported with an invisible stone mount, said method comprising the steps of:

providing a rubber mold for producing a wax pattern of the jewelry;

placing a gold metal bar into a stone mount region of the mold, corresponding to a stone-mount region of the jewelry;

injecting a substance into said mold to form a wax pattern of said jewelry, including the gold bar therein;

inserting the stones into set positions thereof in the wax pattern on opposite sides of the gold bar which forms an invisible preset stone mount;

embedding said wax pattern, containing said metal segment with the stones positioned in an investment material;

melting the wax pattern to provide a mold cavity with said gold bar segment and the supported stones being suspended therein;

injecting molten metal into the mold cavity to form a casting of the jewelry with the invisibly supported stones; and separating the investment material to remove the jewelry with the invisibly preset stones;

trimming said jewelry to remove undesired portions; and finishing said jewelry.

* * * * *